United States Patent [19]

Jacobs

[11] 4,402,575

[45] Sep. 6, 1983

[54] WIDEBAND OPTICAL BEAM DEFLECTOR

[75] Inventor: John H. Jacobs, Altadena, Calif.

[73] Assignee: Bell & Howell Company, Chicago, Ill.

[21] Appl. No.: 259,662

[22] Filed: May 1, 1981

[51] Int. Cl.³ .................. G02B 27/17; G05D 25/00
[52] U.S. Cl. .................................. 350/486; 350/289
[58] Field of Search ............ 350/484, 486, 487, 6.5, 350/6.6, 289, 299

[56] References Cited

U.S. PATENT DOCUMENTS

| | | | |
|---|---|---|---|
| 3,544,202 | 12/1970 | Fowler | 350/487 |
| 3,612,642 | 10/1971 | Dostal | 350/486 |
| 3,619,028 | 11/1971 | Keene et al. | 350/486 |
| 3,902,783 | 9/1975 | Bodlaj | 350/487 |
| 4,307,939 | 12/1981 | Berg | 350/6.6 |

Primary Examiner—R. A. Rosenberger
Attorney, Agent, or Firm—Charles P. Sammut

[57] ABSTRACT

A wideband optical beam deflector utilizes an electromechanical transducer to simultaneously rotate a plurality of mirrors. An incoming optical beam is successively reflected by these rotating mirrors such that the deflections of the mirrors are additive. The deflector may also incorporate a stationary mirror to complete the reflector path.

43 Claims, 8 Drawing Figures

WIDEBAND OPTICAL BEAM DEFLECTOR

BACKGROUND OF THE INVENTION

1. Field of the Invention

This invention relates generally to an optical beam deflection apparatus and in particular to a wideband optical beam deflection apparatus which utilizes a high frequency electromechanical transducer to actuate a plurality of mirrors to deflect an incoming optical beam.

2. Disclosure Statement

This disclosure statement is made pursuant to the duty of disclosure imposed by law and formulated in 37 CFR 1.56(a). No representation is hereby made that information thus disclosed in fact constitutes prior-art inasmuch as 37 CFR 1.56(a) relies on a materiality concept which depends upon uncertain and inevitably subjective elements of substantial likelihood and reasonableness, and inasmuch as a growing attitude appears to require citation of materials which might lead to a discovery of pertinent material, though being not of themselves pertinent.

Devices for deflecting an optical beam are useful in oscillography, in the recording and retrieval of information from an optical store and as the actuating means in an optical servo loop. Mirror galvanometers, which are commonly used in these applications, utilize a mirror mechanically coupled to a coil which moves with a magnetic field (known as a d' Arsonval mirror galvanometer). Those mirror galvanometers with the smallest mirrors may have a useful frequency response up to several thousand hertz, but the frequency response drops sharply as the mass of the mirror increases. The use of small mirrors, however, limits the aperture of the optical beam that may be used with them.

Where higher frequency response is required, acousto-optical deflectors have been used. Acousto-optical deflectors have a frequency response up to one megahertz, however, these devices are comparatively expensive. Furthermore, acousto-optical deflectors require signal processing electronics and well-collimated monochromatic radiation, as well as requiring careful angular adjustment with respect to the optical beam to be deflected.

Various optical beam deflection devices are disclosed in the prior art. For example, U.S. Pat. No. 3,902,783 discloses a beam deflector having a pair of piezoelectric transducers which have opposite states of expansion and contraction, the transducers both being connected to a rocker which rotates a pair of mirrors.

U.S. Pat. No. 3,753,199 discloses a beam deflector having a pair of piezoelectric transducers rigidly cantilevered at one end from a support member and articulately connected at the other end to a mirror.

U.S. Pat. No. 3,612,642 discloses an optical scanner having first and second mirrors mounted on the tines of an electronically driven torsional tuning fork, the mirrors being oscillated thereby. An incoming beam of light is directed toward the first mirror which reflects it onto the second mirror, the second mirror directing the beam onto a fixed third mirror. The third mirror acts to duplex the beam by directing it back ot the second mirror, which returns its beam to the first mirror.

SUMMARY OF THE INVENTION

This invention is directed toward an apparatus for deflecting an optical beam. In general, this is accomplished by utilizing a high frequency electromechanical actuator such as one of the piezoelectric type, to drive a plurality of moving mirrors. One side of each of the moving mirrors is attached to a rigid frame through a hinge. A linkage couples the opposite side of each of these mirrors to the actuator. An alternative embodiment utilizes a fixed mirror, to provide a reflection path whereby the optical beam is directed toward an adjacent mirror.

Other alternative embodiments utilize a fixed mirror to reflect the beam back upon the moving mirrors such that the output beam leaves the plane of the incident optical beam by a few degrees.

Many additional features and advantages of the invention will be apparent from a reading of the specification in which illustrative embodiments of the invention are described in detail. This specification is to be taken with the accompanying drawing in which the various characteristics of the preferred embodiments are illustrated.

DESCRIPTION OF THE PREFERRED EMBODIMENTS

Figure 1:
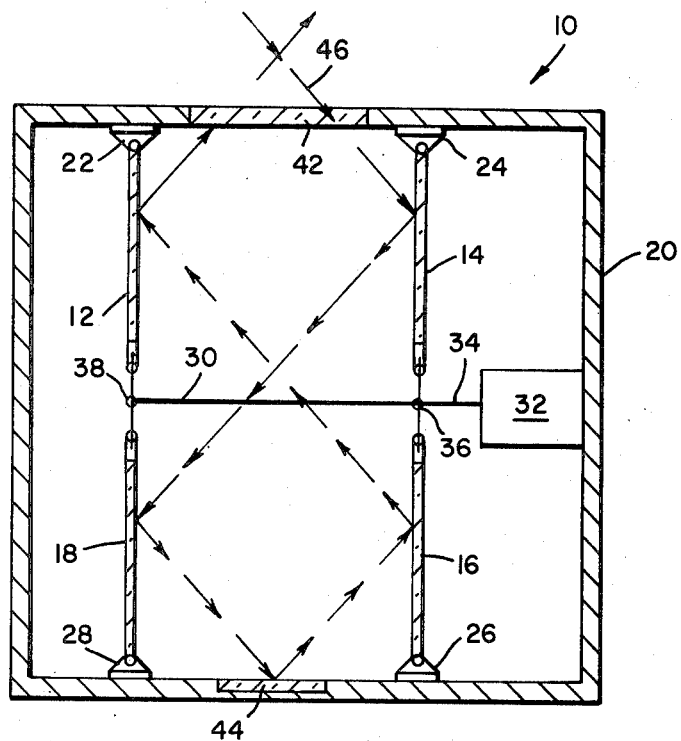
FIG. 1 is a top plan view of an apparatus embodying the present invention.
Figure 8:
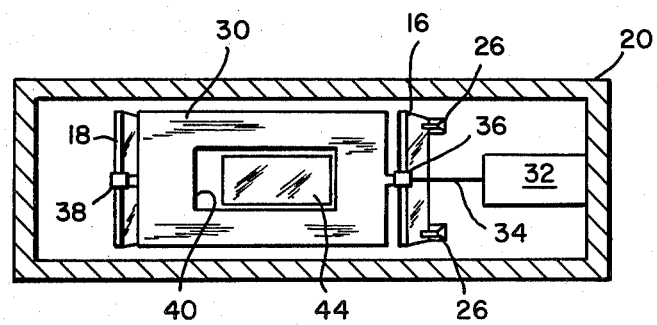
FIG. 8 is a side sectional view of the apparatus of FIG. 2 taken along line 8—8.

Referring to the drawing wherein identical reference numerals refer to similar elements, FIG. 1 shows a wideband optical beam deflector at 10. The deflector 10 utilizes a set of moving mirrors 12, 14, 16 and 18. The moving mirrors 12, 14, 16 and 18 are attached to a frame 20 by a set of hinges 22, 24, 26 and 28 respectively. The hinges 22, 24, 26 and 28 may be flexure strips, torsion rods or other types of hinges which are well known in the art. A linkage 30 is coupled to a single electromechanical actuator 32 through an output arm 34. A pivot point 36 couples the moving mirrors 14 and 16 to the linkage 34, while a pivot point 38 couples the moving mirrors 12 and 18 to the linkage 30. As shown in FIG. 8, the linkage 30 has an aperture 40 for the passage of incoming and outgoing optical beams. The frame 20 also has an aperture 42 for the passage of incoming and outgoing optical beams. In order to provide structural rigidity to the frame 20, the aperture 42 may be of non-reflecting glass. The aperture 42 may also be merely an opening in the frame 20. A stationary mirror 44 is attached to the frame 20 adjacent to the mirrors 16 and 18.

In operation, an optical beam 46 enters through the aperture 42. The optical beam 46 is successively reflected by the mirrors 14, 18, 44, 16 and 12 and exits through the aperture 42. An electrical signal which is applied to the actuator 32 caused the output arm 34 to move back and forth. The actuator 32 may be a piezoelectric, magnetostrictive or any other electromechanical transducer which has the desired frequency response and which produces motion in the required directions.

Figure 2:
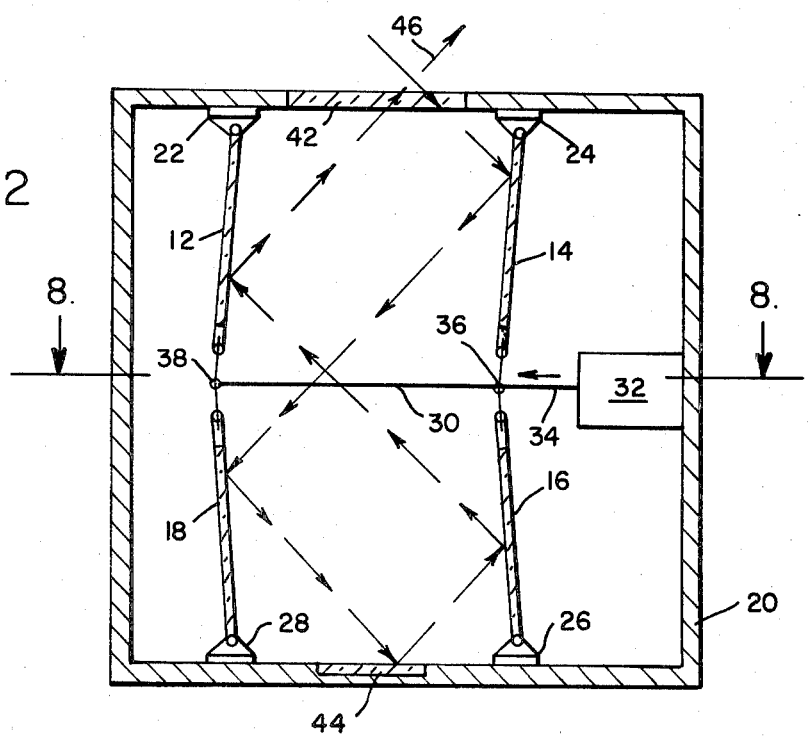
FIG. 2 is a top plan view of the apparatus of FIG. 1, illustrating the deflection of an optical beam in response to movement of the output arm.

As the output arm 34 moves back and forth, the linkage 30 causes the mirrors 12, 14, 16 and 18 to rotate through a small angle about their substantially parallel axes. As shown in FIGS. 2 and 8 when the linkage 30 moves away from the actuator 32 the mirrors 12 and 14 rotate clockwise and the mirrors 16 and 18 rotate counterclockwise. The effect on the optical beam 46 is therefore additive resulting in a deflection of the optical beam 46 in a clockwise direction. By utilizing a plurality of mirrors in the arrangement shown in FIG. 1, the amount of deflection is substantially greater than that of a single mirror.

Figure 3:
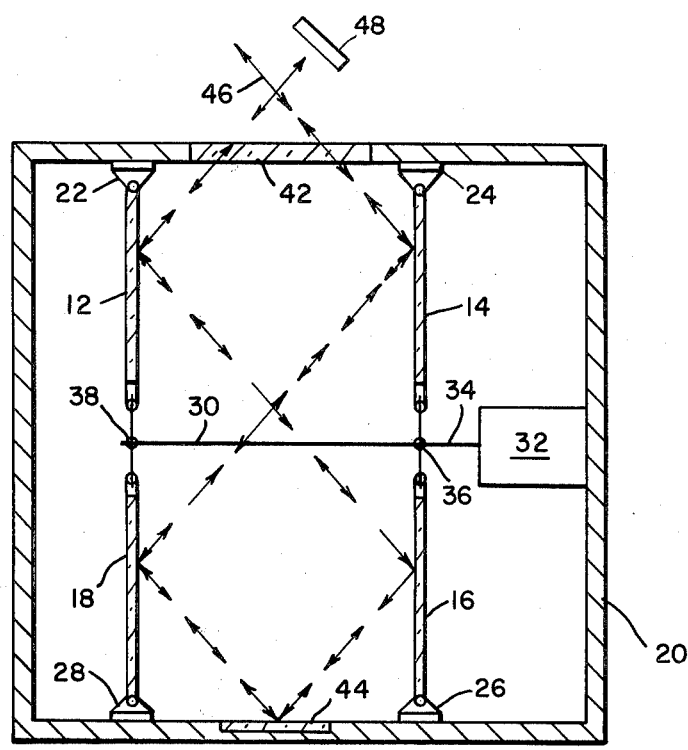
FIG. 3 is a top plan view of a second alternative embodiment of the present invention.

FIG. 3 shows a second embodiment wherein a second stationary mirror 48 has been added to the apparatus of FIG. 1. In operation, the optical beam 46 enters through the aperture 42 and is successively reflected by the mirrors 14, 18, 44, 16, 12, 48, 12, 16, 44, 18 and 14 in that order. In the embodiment shown in FIG. 3, the outgoing optical beam 46 may be separated from the ingoing optical beam 46 by orienting the mirror 48 such that the outgoing optical beam 44 is in a slightly different plane than that of the ingoing optical beam 44. The use of the mirror 48 results in approximately twice the deflection per unit input signal as with the embodiment shown in FIG. 1.

Figure 4:
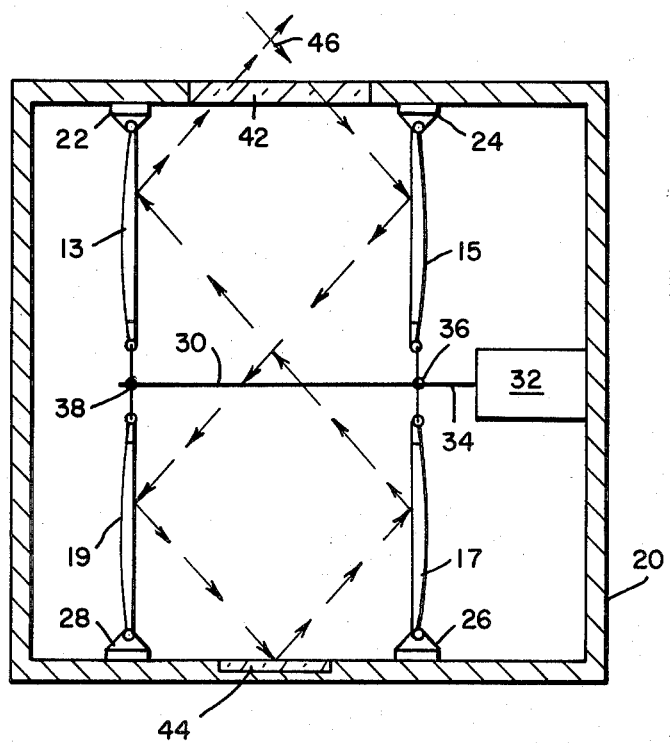
FIG. 4 is a top plan view of a third alternative embodiment of the present invention.

The frequency response of the deflector 10 may be increased by lowering the mass of the mirrors 12, 14, 16 and 18 as shown in FIG. 4. In FIG. 4, mirrors 13, 15, 17 and 19 are shaped to reduce their mass. By structuring each mirror such that it is thicker at its center and tapered at its ends, undue flexure which may contribute to distortion of the optical wavefront, undesired resonances or non-linearity of response is minimized. In order to further eliminate undesirable flexural modes of the mirrors, the center portion of the rear of each mirror may be ribbed.

Figure 5:
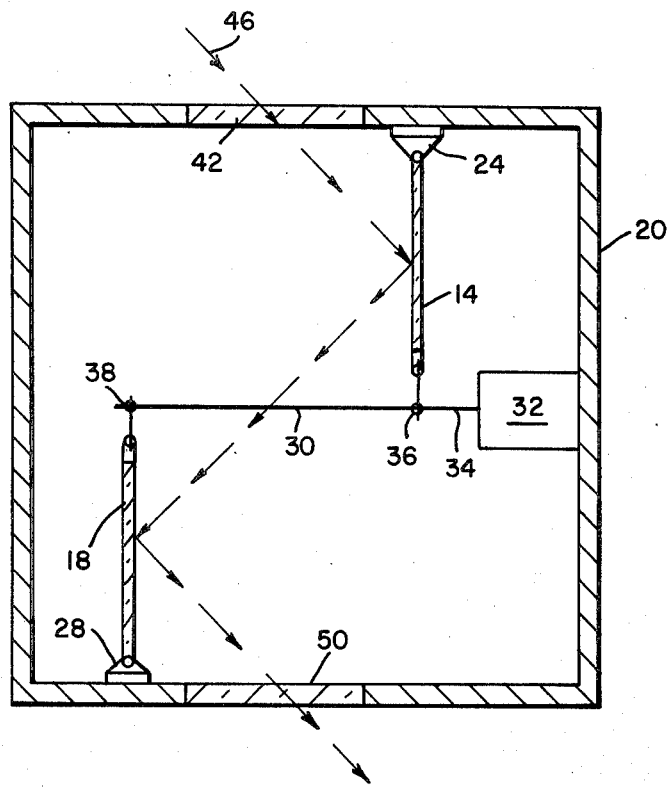
FIG. 5 is a top plan view of a fourth alternative embodiment of the present invention.
Figure 6:
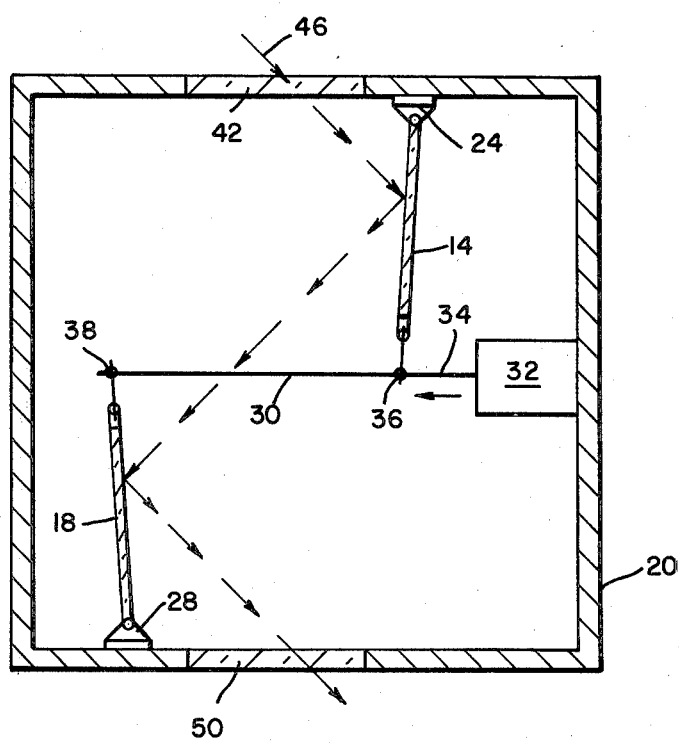
FIG. 6 is a top plan view of the apparatus of FIG. 5, illustrating the deflection of an optical beam in response to the movement of the output arm.

FIG. 5 shows an embodiment wherein the mass of the moving mirrors is reduced by removing the mirrors 12 and 16 of the FIG. 1. In addition, the hinges 22 and 26 of FIG. 1 may be omitted. In operation, as the beam 46 enters through the aperture 42, the beam 46 is successively reflected off the mirrors 14 and 18 and exits through an aperture 50. Since only two moving mirrors are utilized in this embodiment, the amount of deflection per unit electrical signal is less than with the embodiments shown in FIGS. 1, 2, 3 and 4. As shown in FIG. 6, when the linkage 30 moves away from the actuator 32, the mirror 14 rotates clockwise and the mirror 18 rotates counterclockwise. The effect on the optical beam 46 is therefore additive resulting in a greater deflection of the optical beam 46 than would be possible with a single mirror.

Figure 7:
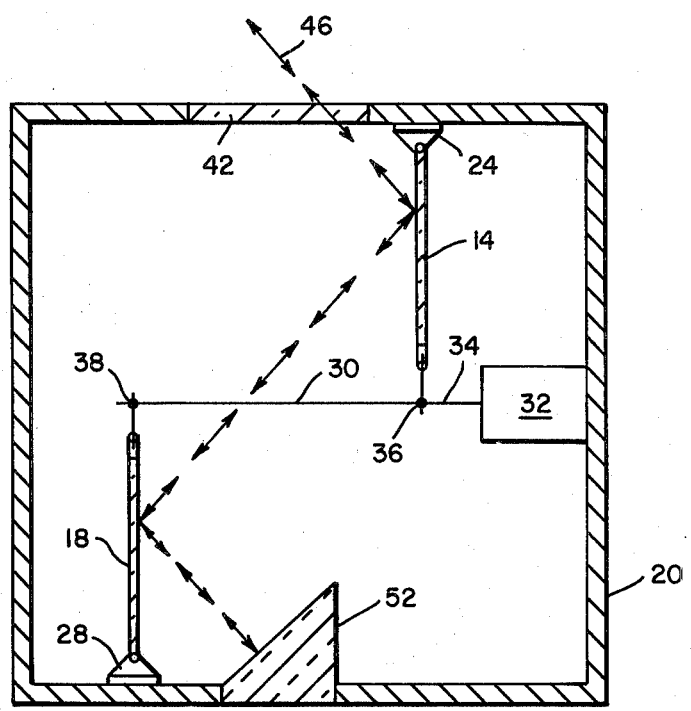
FIG. 7 is a top plan view of a fifth alternative embodiment of the present invention.

FIG. 7 shows an embodiment where the amount of deflection per unit electrical signal is increased by replacing the aperture 50 with a stationary mirror 52. In operation, the optical beam 46 is reflected off the mirrors 14, 18, 52, 18 and 14 in that order. The outgoing optical beam 46 may be separated from the ingoing optical beam 46 by orienting the mirror 52 such that the outgoing optical beam 46 is in a slightly different plane than that of the ingoing optical beam 46.

It is to be understood that the subject invention has been described by reference to specific embodiments and that many additions and modifications thereto will be apparent to those skilled in the art. Accordingly, the foregoing description is not to be construed in a limiting sense.

I claim:

1. An apparatus for deflecting an optical beam in response to an electrical signal comprising:
    a substantially rigid frame,
    a plurality of moving mirrors arranged to each successively reflect the optical beam at least once, each mirror having a first end flexibly attached to the frame to permit rotation of each mirror about substantially parallel axes,
    common linkage means attached to a second end of each of the moving mirrors, operative to rotate the mirrors to thereby cumulatively deflect the optical beam,
    a stationery mirror fixedly mounted to the frame operative to reflect the optical beam from one moving mirror to another moving mirror, and a single electromechanical actuator attached to the linkage means operative to actuate the linkage means in response to the electrical signal.

2. The apparatus of claim 1 wherein the piezoelectric means further comprises:
    an electromechanical actuator fixedly mounted to the frame, the electromechanical actuator having an output arm operative to transmit forces from the electromechanical actuator to the linkage means.

3. The apparatus of claim 1 wherein each moving mirror further comprises:
    a doubly tapered structure having a greater mass at its midsection than at each end.

4. The apparatus of claim 1 wherein the moving mirrors are substantially parallel to each other when the magnitude of the electrical signal is substantially zero.

5. The apparatus of claim 1, 2, 3 or 4 wherein the plurality of moving mirrors further comprises:
    a first pair of moving mirrors, each mirror having its second end attached to a first common point of the linkage means, and
    a second pair of moving mirrors, each mirror having its second end attached to a second common point of the linkage means.

6. The apparatus of claim 1, 2, 3 or 4 wherein the plurality of moving mirrors further comprises:
    a first moving mirror having its second end attached to a first point of the linkage means, and
    a second moving mirror having its second end attached to a second point of the linkage means.

7. An apparatus for deflecting an optical beam in response to an electrical signal comprising:
    a plurality of moving mirrors arranged to each successively reflect the optical beam at least once, each moving mirror having a first end flexibly mounted to a substantially stationary member to permit rotation of each moving mirror about substantially parallel axes,
    common linkage means attached to a second end of each of the moving mirrors, operative to rotate the mirrors to thereby cumulatively deflect the optical beam,
    a stationery mirror fixedly mounted to the substantially stationary member, operative to reflect the optical beam from one moving mirror to another moving mirror, and a single electromechanical actuator attached to the linkage means, operative to actuage the linkage means in response to the electrical signal.

8. The apparatus of claim 7 wherein the electromechanical means further comprises:
an electromechanical actuator fixedly mounted to the substantially stationary member, the electromechanical actuator having an output arm operative to transmit forces from the electromechanical actuator to the linkage means.

9. The apparatus of claim 7 wherein each moving mirror further comprises:
a doubly tapered structure having a greater mass at its midsection than at each end.

10. The apparatus of claim 7 wherein the moving mirrors are substantially parallel to each other when the magnitude of the electrical signal is substantially zero.

11. The apparatus of claim 7, 8, 9 or 10 wherein the plurality of moving mirrors further comprises,
a first pair of moving mirrors, each mirror having its second end attached to a first common point of the linkage means, and
a second pair of moving mirrors, each mirror having its second end attached to a second common point of the linkage means.

12. The apparatus of claim 7, 8, 9 or 10 wherein the plurality of mirrors further comprises:
a first moving mirror having its second end attached to a first point of the linkage means, and
a second moving mirror having its second end attached to a second point of the linkage means.

13. An apparatus for deflecting an optical beam in response to an electrical signal comprising:
a substantially rigid frame,
a plurality of moving mirrors arranged to each successively reflect the optical beam at least once, each mirror having a first end flexibly attached to the frame to permit rotation of each mirror about substantially parallel axes,
common linkage means attached to a second end of each of the moving mirrors, operative to rotate the mirrors to thereby cumulatively deflect the optical beam,
a first stationary mirror fixedly mounted to the frame, operative to reflect the optical beam from one moving mirror to another moving mirror,
a second stationary mirror mounted adjacent to the frame, operative to reflect the optical beam from one moving mirror back to the same moving mirror, and
a single electromechanical actuator attached to the linkage means operative to actuate the linkage means in response to the electrical signal.

14. The apparatus of claim 13 wherein the piezoelectric means further comprises:
an electromechanical actuator fixedly mounted to the frame, the electromechanical actuator having an output arm operative to transmit forces from the electromechanical actuator to the linkage means.

15. The apparatus of claim 13 wherein each moving mirror further comprises:
a doubly tapered structure having a greater mass at its midsection than at each end.

16. The apparatus of claim 13 wherein the moving mirrors are substantially parallel to each other when the magnitude of the electrical signal is substantially zero.

17. The apparatus of claim 13, 14, 15 or 16 wherein the plurality of moving mirrors further comprises:
a first pair of moving mirrors, each mirror having its second end attached to a first common point of the linkage means, and
a second pair of moving mirrors, each mirror having its second end attached to a second common point of the linkage means.

18. The apparatus of claim 13, 14, 15 or 16 wherein the plurality of moving mirrors further comprises:
a first moving mirror having its second end attached to a first point of the linkage means, and
a second moving mirror having its second end attached to a second point of the linkage means.

19. An apparatus for defecting an optical beam in response to an electrical signal comprising:
a plurality of moving mirrors arranged to each successively reflect the optical beam as least once, each moving mirror having a first end flexibly mounted to a substantially stationary member to permit rotation of each moving mirror about substantially parallel axes,
common linkage means attached to a second end of each of the moving mirrors, operative to rotate the mirrors to thereby cumulatively deflect the optical beam,
a first stationary mirror fixedly mounted to the substantially stationary member, operative to reflect the optical beam from one moving mirror to another moving mirror,
a second stationary mirror adjacent to the substantially stationary member operative to reflect the optical beam from one moving mirror back to the same moving mirror, and a single electromechanical actuator attached to the linkage means, operative to actuage the linkage means in response to the electrical signal.

20. The apparatus of claim 19 wherein the electromechanical means further comprises:
an electromechanical actuator fixedly mounted to the substantially stationary member, the electromechanical actuator having an output arm operative to transmit forces from the electromechanical actuator to the linkage means.

21. The apparatus of claim 19 wherein each moving mirror further comprises:
a doubly tapered structure having a greater mass at its midsection than at each end.

22. The apparatus of claim 19 wherein the moving mirrors are substantially parallel to each other when the magnitude of the electrical signal is substantially zero.

23. The apparatus of claim 19, 20, 21 or 22 wherein the plurality of moving mirrors further comprises:
a first pair of moving mirrors, each mirror having its second end attached to a first common point of the linkage means, and
a second pair of moving mirrors, each mirror having its second end attached to a second common point of the linkage means.

24. An apparatus for deflecting an optical beam in response to an electrical signal comprising:
a substantially rigid frame,
a plurality of moving mirrors arranged to each successively reflect the optical beam at least once, each mirror having a first end flexibly attached to the frame to permit rotation of each mirror about substantially parallel axes,
common linkage means attached to a second set of each of the moving mirrors, operative to rotate the mirrors to thereby cumulatively deflect the optical beam, and
a single electromechanical actuator attached to the linkage means operative to actuate the linkage means in response to the electrical signal.

25. The apparatus of claim 24 wherein the electromechanical actuator means further comprises:
an electromechanical actuator fixedly mounted to the frame, the electromechanical actuator having an output arm operative to transmit forces from the electromechanical actuator to the linkage means.

26. The apparatus of claim 24 wherein each moving mirror further comprises:
a doubly tapered structure having a greater mass at its midsection than at each end.

27. The apparatus of claim 24 wherein the moving mirrors are substantially parallel to each other when the magnitude of the electrical signal is substantially zero.

28. The apparatus of claim 24, 25, 26 or 27 wherein the plurality of moving mirrors further comprises:
a first moving mirror having its second end attached to a first point of the linkage means, and
a second moving mirror having its second end attached to a second point of the linkage means.

29. An apparatus for deflecting an optical beam in response to an electrical signal comprising:
a plurality of moving mirrors arranged to each successively reflect the optical beam at least once, each moving mirror having a first end flexibly mounted to a substantially stationary member to permit rotation of each moving mirror about substantially parallel axes,
common linkage means attached to a second end of each of the moving mirrors, operative to rotate the mirrors to thereby cumulatively deflect the optical beam, and
a single electromechanical actuator attached to the linkage means, operative to actuage the linkage means in response to the electrical signal.

30. The apparatus of claim 29 wherein the electromechanical actuator means further comprises:
an electromechanical actuator fixedly mounted to the substantially stationary member, the electromechanical actuator having an output arm operative to transmit forces from the electromechanical actuator to the linkage means.

31. The apparatus of claim 29 wherein each moving mirror further comprises:
a doubly tapered structure having a greater mass at its midsection than at each end.

32. The apparatus of claim 29 wherein the moving mirrors are substantially parallel to each other when the magnitude of the electrical signal is zero.

33. The apparatus of claim 29, 30, 31 or 32 wherein the plurality of moving mirrors further comprises:
a first moving mirror having its second end attached to a first point of the linkage means, and
a second moving mirror having its second end attached to a second point of the linkage means.

34. An apparatus for deflecting an optical beam in response to an electrical signal comprising:
a substantially rigid frame,
a plurality of moving mirrors, each moving mirror arranged to successively reflect the optical beam at least twice, each moving mirror having a first end flexibly attached to the frame to permit rotation of each moving mirror about substantially parallel axes,
common linkage means attached to a second end of each mirror operative to rotate the mirrors to thereby cumulatively deflect the optical beam,
a stationary mirror fixedly mounted to the frame, operative to reflect the optical beam from one moving mirror back to the same moving mirror, and
a single electromechanical actuator attached to the linkage means, operative to actuate the linkage means in response to the electrical signal.

35. The apparatus of claim 34 wherein the electromechanical actuator means further comprises:
an electromechanical actuator fixedly mounted to the frame, the electromechanical actuator output arm operative to transmit forces from the electromechanical actuator to the linkage means.

36. The apparatus of claim 34 wherein each moving mirror further comprises:
a doubly tapered structure having a greater mass at its midsection than at each end.

37. The apparatus of claim 34 wherein the moving mirrors are substantially parallel to each other when the magnitude of the electrical signal is zero.

38. The apparatus of claim 34, 35, 36 or 37 wherein the plurality of moving mirrors further comprises:
a first moving mirror having its second end attached to a first point of the linkage means, and
a second moving mirror having its second end attached to a second point of the linkage means.

39. An apparatus for deflecting an optical beam in response to an electrical signal comprising:
a plurality of moving mirrors each moving mirror arranged to successively reflect the optical beam at least twice, each moving mirror having a first end flexibly attached to a substantially stationary member to permit rotation of each moving mirror about substantially parallel axes,
common linkage means attached to a second end of each mirror, operative to rotate the mirrors to thereby cumulatively deflect the optical beam,
a stationary mirror fixedly mounted to the substantially stationary member, operative to reflect the optical beam from one moving mirror back to the same moving mirror, and
a single electromechanical actuator attached to the linkage means, operative to actuate the linkage means in response to the electrical signal.

40. The apparatus of claim 39 wherein the electromechanical actuator means further comprises:
an electromechanical actuator fixedly mounted to the substantially stationary member, the electromechanical actuator operative to transmit forces to the linkage means.

41. The apparatus of claim 39 wherein each moving mirror further comprises:
a doubly tapered structure having a greater mass at its midsection than at each end.

42. The apparatus of claim 39 wherein the moving mirrors are substantially parallel to each other when the magnitude of the electrical signal is zero.

43. The apparatus of claim 39, 40, 41 or 42 wherein the plurality of moving mirrors further comprises:
a first moving mirror having its second end attached to a first point of the linkage means, and
a second moving mirror having its second end attached to a second point of the linkage means.

* * * * *